(12) United States Patent
Huynh et al.

(10) Patent No.: US 8,921,001 B2
(45) Date of Patent: Dec. 30, 2014

(54) HERMETIC HIGH TEMPERATURE DIELECTRIC CONDUIT ASSEMBLIES

(71) Applicant: Bloom Energy Corporation, Sunnyvale, CA (US)

(72) Inventors: James Huynh, Fremont, CA (US); Michael Petrucha, Santa Clara, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 0 days.

(21) Appl. No.: 14/090,104

(22) Filed: Nov. 26, 2013

(65) Prior Publication Data

US 2014/0147766 A1    May 29, 2014

Related U.S. Application Data

(60) Provisional application No. 61/730,595, filed on Nov. 28, 2012.

(51) Int. Cl.
*H01M 8/24* (2006.01)
*H01M 8/04* (2006.01)
*H01M 8/02* (2006.01)

(52) U.S. Cl.
CPC .......... *H01M 8/2425* (2013.01); *H01M 8/0252* (2013.01); *H01M 8/2485* (2013.01); *H01M 8/04201* (2013.01); *Y02E 60/50* (2013.01); *Y02E 60/521* (2013.01); *Y02E 60/525* (2013.01)
USPC ....................................................... 429/458

(58) Field of Classification Search
CPC ............ H01M 8/0252; H01M 8/2425; H01M 8/2485; H01M 8/04201
USPC ....................................................... 429/458
See application file for complete search history.

(56) References Cited

U.S. PATENT DOCUMENTS

| | | | |
|---|---|---|---|
| 3,284,118 A | 11/1966 | Kessler, Jr. | |
| 3,746,374 A | 7/1973 | Sedgwick et al. | |
| 8,404,398 B2 | 3/2013 | Perry et al. | |
| 2004/0202914 A1 | 10/2004 | Sridhar et al. | |
| 2005/0164051 A1 | 7/2005 | Venkataraman et al. | |
| 2006/0204827 A1 | 9/2006 | Hickey et al. | |
| 2007/0196704 A1 | 8/2007 | Valensa et al. | |
| 2007/0269693 A1 | 11/2007 | Perry | |
| 2010/0040934 A1 | 2/2010 | Perry et al. | |
| 2010/0151346 A1 | 6/2010 | Eickhoff | |

FOREIGN PATENT DOCUMENTS

| | | |
|---|---|---|
| JP | 61067565 A | 4/1986 |
| JP | 02119059 A | 5/1990 |
| JP | 11-351467 A | 12/1999 |

OTHER PUBLICATIONS

McDonald, H., "Chattanooga Fuel Cell Demonstration Project," U.S. Department of Energy Hydrogen Program, 2005, www.hydrogen.energy.gov/pdfs/progress05/viii_d_3_mcdonald.pdf, pp. 1209-1214.
Ferguson et al., "Chattanooga Fuel Cell Demonstration Project," U.S. Department of Energy Hydrogen Program, Annual Merit Review Meeting, May 23-26, 2005, http://www.hydrogen.energy.gov/pdfs/review05/tvp_2_ferquson.pdf, 20pgs.
International Search Report and Written opinion received in connection with international application No. PCT/US2013/071823; dtd Mar. 14, 2014.

*Primary Examiner* — Jonathan Jelsma
(74) *Attorney, Agent, or Firm* — The Marbury Law Group PLLC

(57) ABSTRACT

A conduit assembly for a fuel cell system includes a dielectric tube comprising a first end and a second end, a first metal tube including a first lip coupled to the first end of the dielectric tube, a first dielectric ring coupled to the first lip of the first metal tube, a second metal tube including a second lip coupled to the second end of the dielectric tube, and a second dielectric ring coupled to the second lip of the second metal tube.

20 Claims, 8 Drawing Sheets

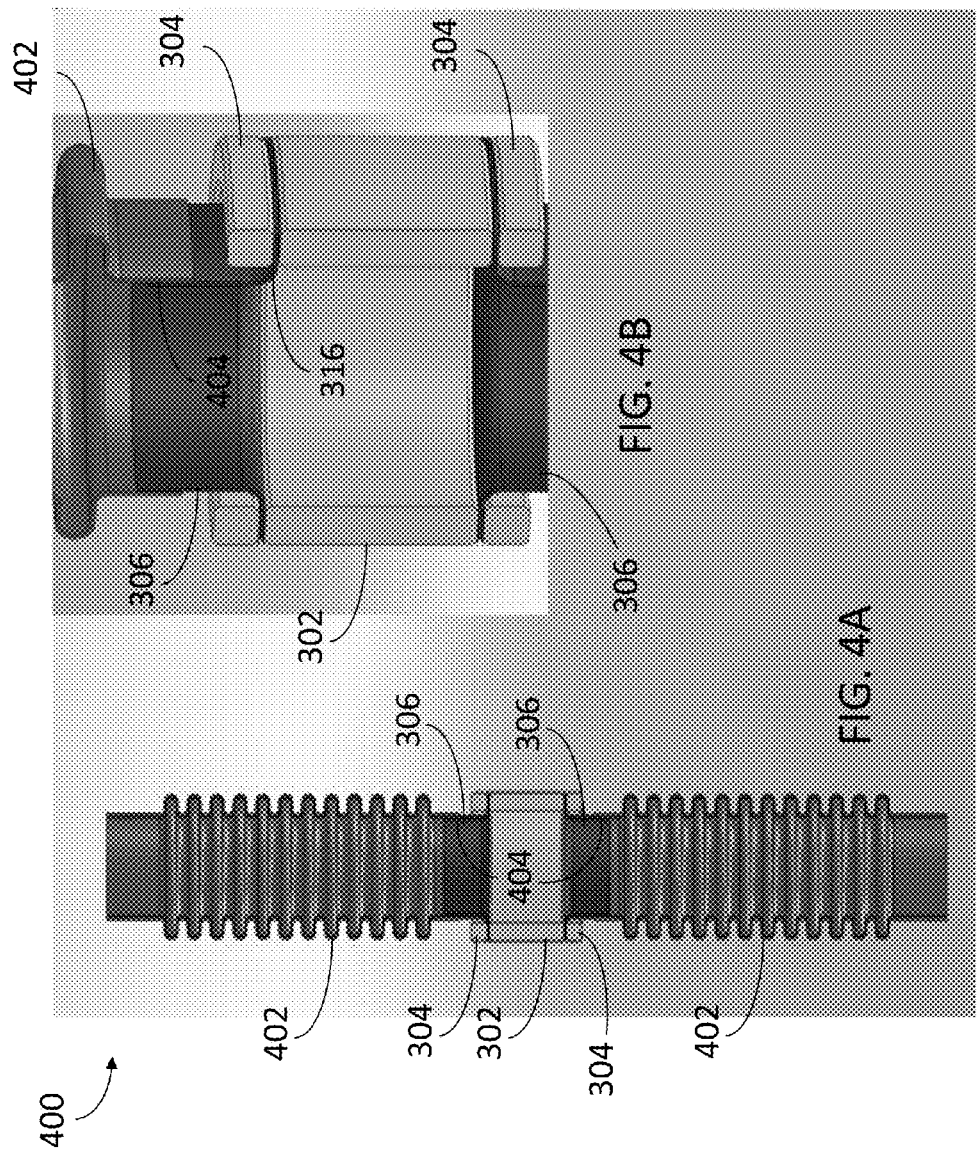

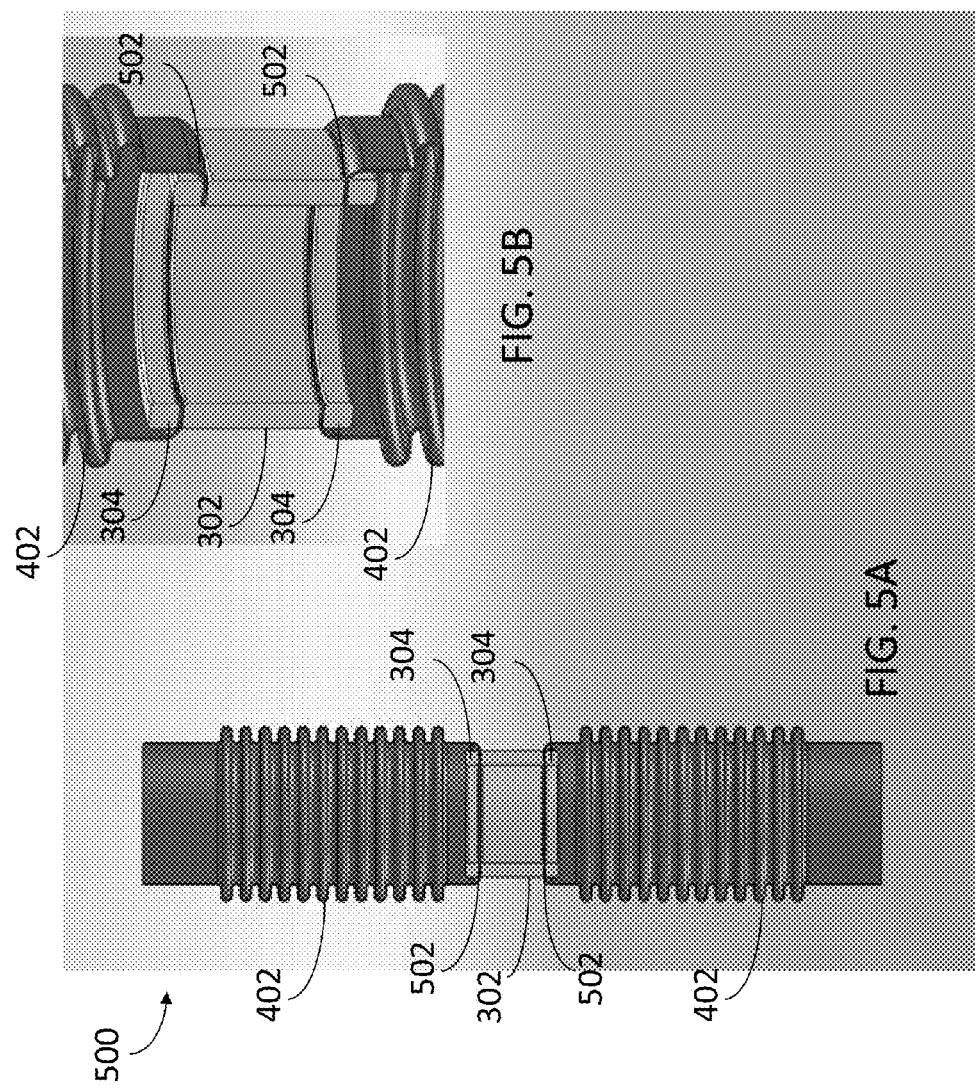

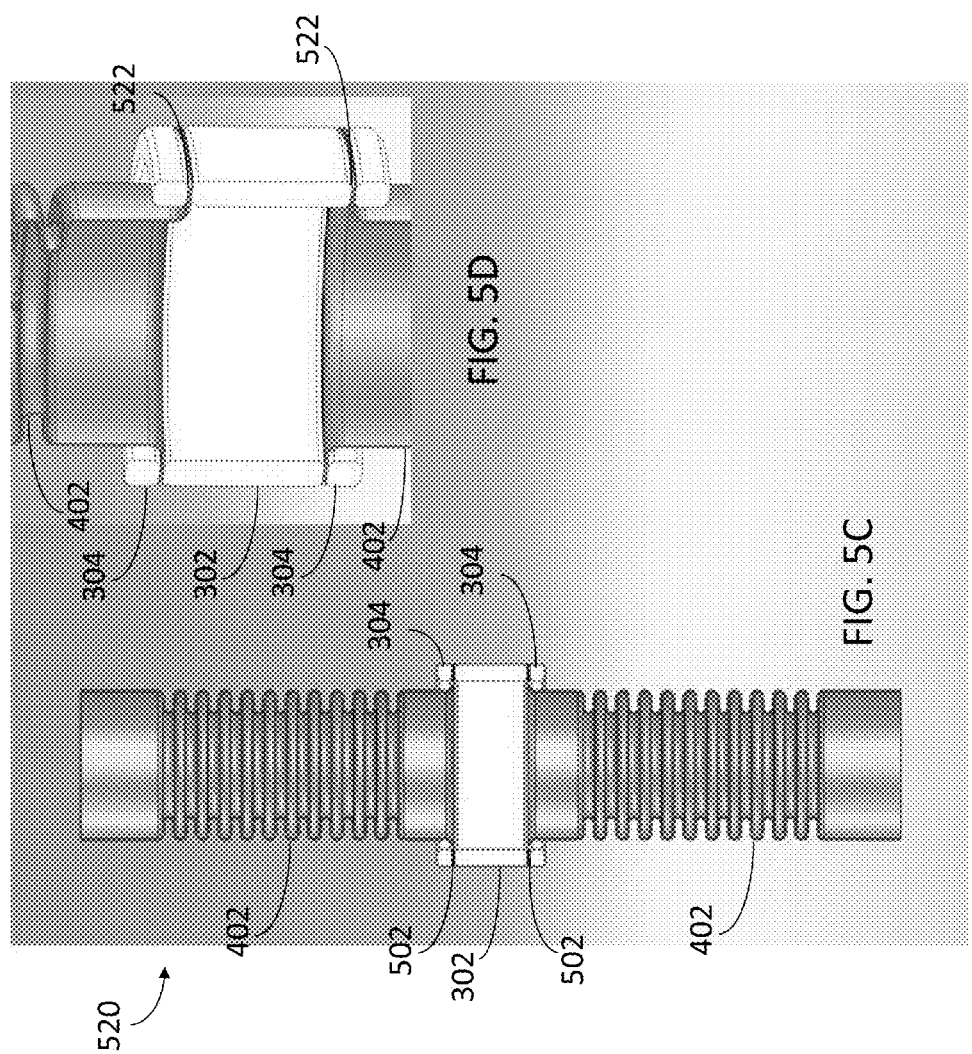

US 8,921,001 B2

HERMETIC HIGH TEMPERATURE DIELECTRIC CONDUIT ASSEMBLIES

CROSS-REFERENCE TO RELATED APPLICATION

The present application claims benefit of U.S. Provisional Application Ser. No. 61/730,595 filed on Nov. 28, 2012, which is incorporated herein by reference in its entirety.

BACKGROUND

Fuel cells are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide reversible fuel cells, that also allow reversed operation, such that water or other oxidized fuel can be reduced to unoxidized fuel using electrical energy as an input.

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow is typically a hydrogen-rich gas created by reforming a hydrocarbon fuel source. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

Fuel cell stacks may be either internally or externally manifolded for fuel and air. In internally manifolded stacks, the fuel and air is distributed to each cell using risers contained within the stack. In other words, the gas flows through openings or holes in the supporting layer of each fuel cell, such as the electrolyte layer, and gas separator of each cell. In externally manifolded stacks, the stack is open on the fuel and air inlet and outlet sides, and the fuel and air are introduced and collected independently of the stack hardware. For example, the inlet and outlet fuel and air flow in separate conduits between the stack and the manifold housing in which the stack is located.

Fuel cell stacks are frequently built from a multiplicity of cells in the form of planar elements, tubes, or other geometries. Fuel and air has to be provided to the electrochemically active surface, which can be large. One component of a fuel cell stack is the so called gas flow separator (referred to as a gas flow separator plate in a planar stack) that separates the individual cells in the stack. The gas flow separator plate separates fuel, such as hydrogen or a hydrocarbon fuel, flowing to the fuel electrode (i.e., anode) of one cell in the stack from oxidant, such as air, flowing to the air electrode (i.e., cathode) of an adjacent cell in the stack. Frequently, the gas flow separator plate is also used as an interconnect which electrically connects the fuel electrode of one cell to the air electrode of the adjacent cell. In this case, the gas flow separator plate which functions as an interconnect is made of or contains an electrically conductive material.

SUMMARY

The various embodiments provide a conduit assembly including a dielectric tube comprising a first end and a second end, a first metal tube including a first lip coupled to the first end of the dielectric tube, a first dielectric ring coupled to the first lip of the first metal tube, a second metal tube including a second lip coupled to the second end of the dielectric tube, and a second dielectric ring coupled to the second lip of the second metal tube.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

FIG. 4A is a side cross-sectional view of an embodiment dielectric conduit assembly in which the metal tubes are coupled with metal bellows. FIG. 4B is a close up of the assembly.

FIG. 5A is a side cross-sectional view of an embodiment dielectric conduit assembly in which the metal tubes are metal bellows. FIG. 5B is a close up of the assembly.

FIG. 5C is a side cross-sectional view of an alternate embodiment dielectric conduit assembly in which the metal tubes are metal bellows. FIG. 5D is a close up of the assembly.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Various embodiments provide hermetic dielectric conduit assemblies which may be incorporated into a fuel cell system, such as into the fuel conduits of fuel cell stacks externally manifolded for air and internally manifolded for fuel. The embodiment dielectric conduit assemblies may withstand the high temperatures and thermal cycling that occurs in the hot area of the fuel cell system or inside a fuel cell system's insulated hot box (e.g., with temperatures up to 1000° C., 1250° C., or higher) without leaking or otherwise failing. For example, in some embodiments, the dielectric conduit assembly may be part of a hermetically sealed gas delivery line in a fuel cell system and may include components that compensate for changes in stress due to thermal expansion.

Various embodiment conduit assemblies may compensate for differences in coefficients of thermal expansion of various components and the uneven expansion and associated stress that may result at high temperatures in the fuel cell system. Further, embodiment conduit assemblies may withstand the cycling of expansion and contraction resulting from heating and cooling of the fuel cell system, such as cycling between temperatures from 24° C. to 1000° C.

In various embodiments, the embodiment dielectric conduit assemblies may also act to electrically isolate portions of the fuel conduits or the fuel cell stack. For example, the dielectric conduit assembly may allow the use of metallic fuel manifold plates in the stack by electrically isolating the fuel cell stack or column from the balance of the fuel delivery plumbing. The metallic manifold plates beneficially provide continuous electrical conductivity within a stack or column, thereby reducing the possibility for degradation of resistance connections, as will be described below.

Figure 1:
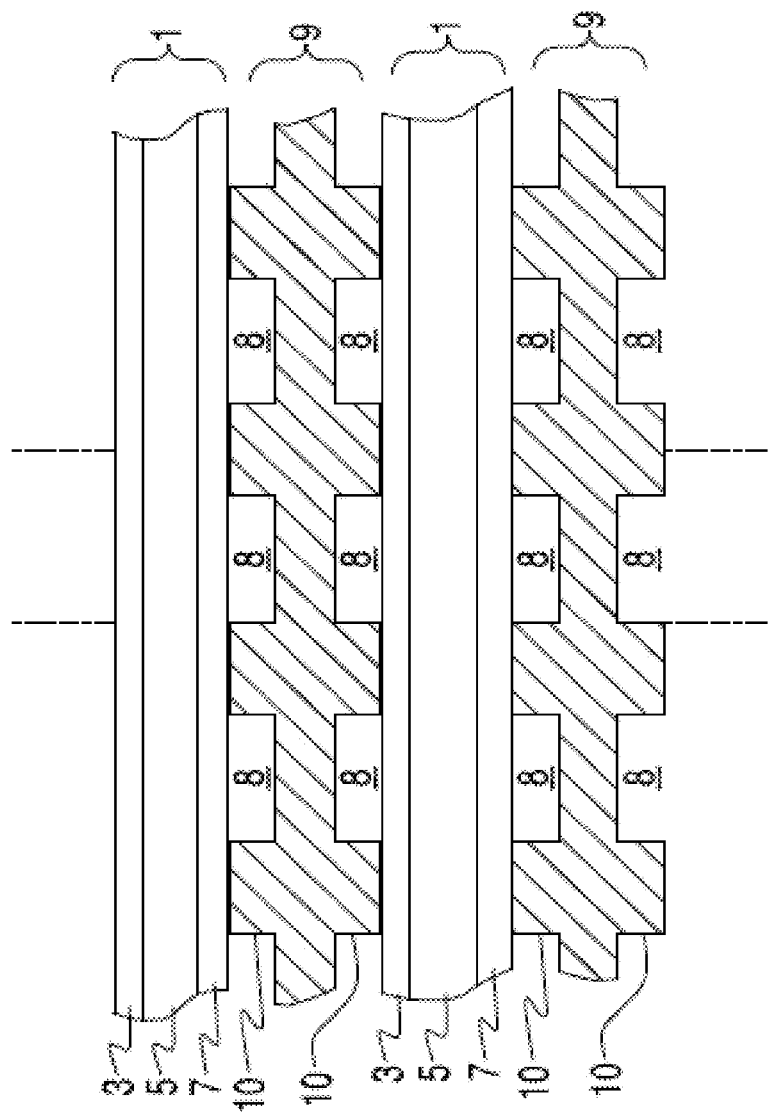
FIG. 1 illustrates a side cross-sectional view of a SOFC stack.

FIG. 1 illustrates a solid oxide fuel cell (SOFC) stack in which each SOFC 1 comprises a cathode electrode 3 (e.g., LSM or other conductive perovskites), a solid oxide electrolyte 5 (e.g., YSZ, ScSZ, or doped ceria), and an anode electrode 7 (e.g., a cermet such as a nickel-stabilized zirconia and/or doped ceria cermet).

Various materials may be used for the cathode electrode 3, electrolyte 5, and anode electrode 7. For example, the anode electrode may comprise a cermet comprising a nickel containing phase and a ceramic phase. The nickel containing phase may consist entirely of nickel in a reduced state. This phase may form nickel oxide when it is in an oxidized state. Thus, the anode electrode is preferably annealed in a reducing atmosphere prior to operation to reduce the nickel oxide to nickel. The nickel containing phase may include other metals in additional to nickel and/or nickel alloys. The ceramic phase may comprise a stabilized zirconia, such as yttria and/or scandia stabilized zirconia and/or a doped ceria, such as gadolinia, yttria and/or samaria doped ceria.

The electrolyte may comprise a stabilized zirconia, such as scandia stabilized zirconia (SSZ) or yttria stabilized zirconia (YSZ). Alternatively, the electrolyte may comprise another ionically conductive material, such as a doped ceria.

The cathode electrode may comprise an electrically conductive material, such as an electrically conductive perovskite material, such as lanthanum strontium manganite (LSM). Other conductive perovskites, such as LSCo, etc., or metals, such as Pt, may also be used. The cathode electrode may also contain a ceramic phase similar to the anode electrode. The electrodes and the electrolyte may each comprise one or more sublayers of one or more of the above described materials.

Fuel cell stacks are frequently built from a multiplicity of SOFC's 1 in the form of planar elements, tubes, or other geometries. Although the fuel cell stack in FIG. 1 is vertically oriented, fuel cell stacks may be oriented horizontally or in any other direction. Fuel and air may be provided to the electrochemically active surface, which can be large.

The gas flow separator 9 (referred to as a gas flow separator plate when part of a planar stack), containing gas flow passages or channels 8 between ribs 10, separates the individual cells in the stack. The gas flow separator plate separates fuel, such as a hydrocarbon fuel, flowing to the fuel electrode (i.e. anode 7) of one cell in the stack from oxidant, such as air, flowing to the air electrode (i.e. cathode 3) of an adjacent cell in the stack. At either end of the stack, there may be an air end plate or fuel end plate (not shown) for providing air or fuel, respectively, to the end electrode.

Frequently, the gas flow separator plate 9 is also used as an interconnect which electrically connects the anode or fuel electrode 7 of one cell to the cathode or air electrode 3 of the adjacent cell. In this case, the gas flow separator plate which functions as an interconnect is made of or contains electrically conductive material. FIG. 1 shows that the lower SOFC 1 is located between two interconnects 9.

Interconnects may be made of or may contain electrically conductive material, such as a metal alloy (e.g., chromium-iron alloy) or an electrically conductive ceramic material, which optionally has a similar coefficient of thermal expansion to that of the solid oxide electrolyte in the cells (e.g., a difference of 0-10%). An electrically conductive contact layer, such as a nickel contact layer, may be provided between the anode electrode and the interconnect. Another optional electrically conductive contact layer may be provided between the cathode electrode and the interconnect.

The plurality of fuel cells in a fuel cell stack may share a common fuel inlet and exhaust passages or risers. A fuel cell stack may include a distinct electrical entity which contains two end plates on opposite ends of the stack which are connected to power conditioning equipment and the power (i.e., electricity) output of the stack. Thus, in some configurations, the electrical power output from such a distinct electrical entity may be controlled separately from other stacks. In other embodiments, multiple stacks may share the same end plates. In this case, the stacks may jointly comprise a distinct electrical entity (e.g., a column of stacks).

A fuel cell stack may be part of a larger fuel cell system for generating power. The fuel cell stack may be located in a hot zone within such a system. During normal operation, this hot zone may operate at a high temperature, such as a temperature of about 600° C. or more, e.g., 600-1000° C., such as 750-950° C.

Figure 2:
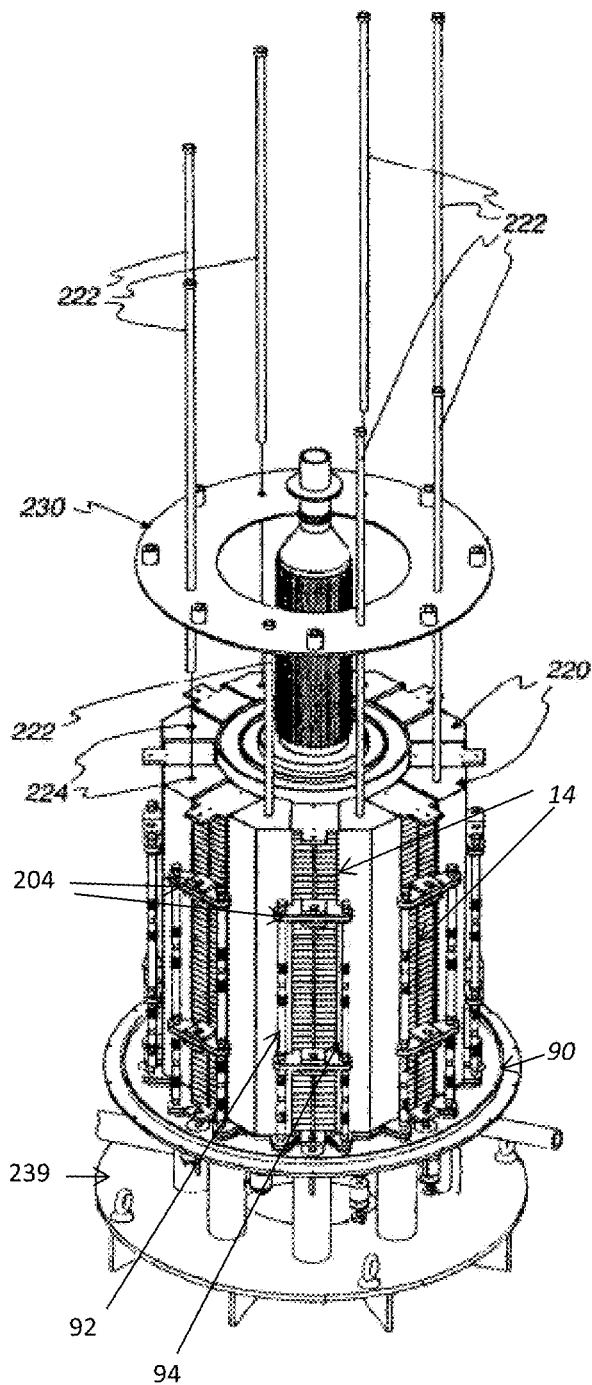
FIG. 2 illustrates a three dimensional cut-away view of a prior art fuel cell assembly.

FIG. 2 illustrates an example of a prior art fuel cell system, such as described in U.S. application Ser. No. 12/458,171 filed on Jul. 2, 2009 and incorporated by reference in its entirety, in which the solid oxide fuel cell (SOFC) stacks 14 are located on a base. Each stack 14 may comprise a collection of fuel cells 1 and interconnects 9. Wedge shaped ceramic side baffles 220 (e.g., having a non-uniform thickness and a roughly triangular cross sectional shape in the horizontal direction) are located between adjacent fuel cell stacks 14 (or columns of fuel cell stacks). The baffles 220 serve to direct the externally manifolded cathode feed (e.g., air) into the cathode flow paths and to fill the space between adjacent stacks so that the cathode feed passes through each of the stacks 14, rather than bypassing around the longitudinal sides of the stacks 14. The baffles 220 are held in place by tie rods 222 that pass through closely fitting bores 224 centrally located in each of the baffles 220. Preferably, the baffles 220 are electrically non-conductive and made as one unitary piece from a suitable ceramic material. FIG. 2 also shows fuel distribution manifolds 204 between the stacks in the stack column and fuel inlet and exhaust conduits 92, 94 connected to the manifolds. The fuel distribution manifolds 204 comprise a box made of metal plates and fuel delivery space inside the box.

In this prior art system, the SOFC stacks maintain a compressive load. The compressive load is maintained by upper pressure plate 230, tie rods 222, lower pressure plate 90 and a compression spring assembly located below the lower pressure plate 90. The compression spring assembly applies a load directly to the lower pressure plate 90 and to the upper pressure plate 230 via the tie rods 222.

In an alternative embodiment, the load is transmitted through the base 239 as this is the only zero datum of the system. Penetrations or feed-throughs through the base 239 are used in order to pull the required load from the base 239.

Figure 3A:
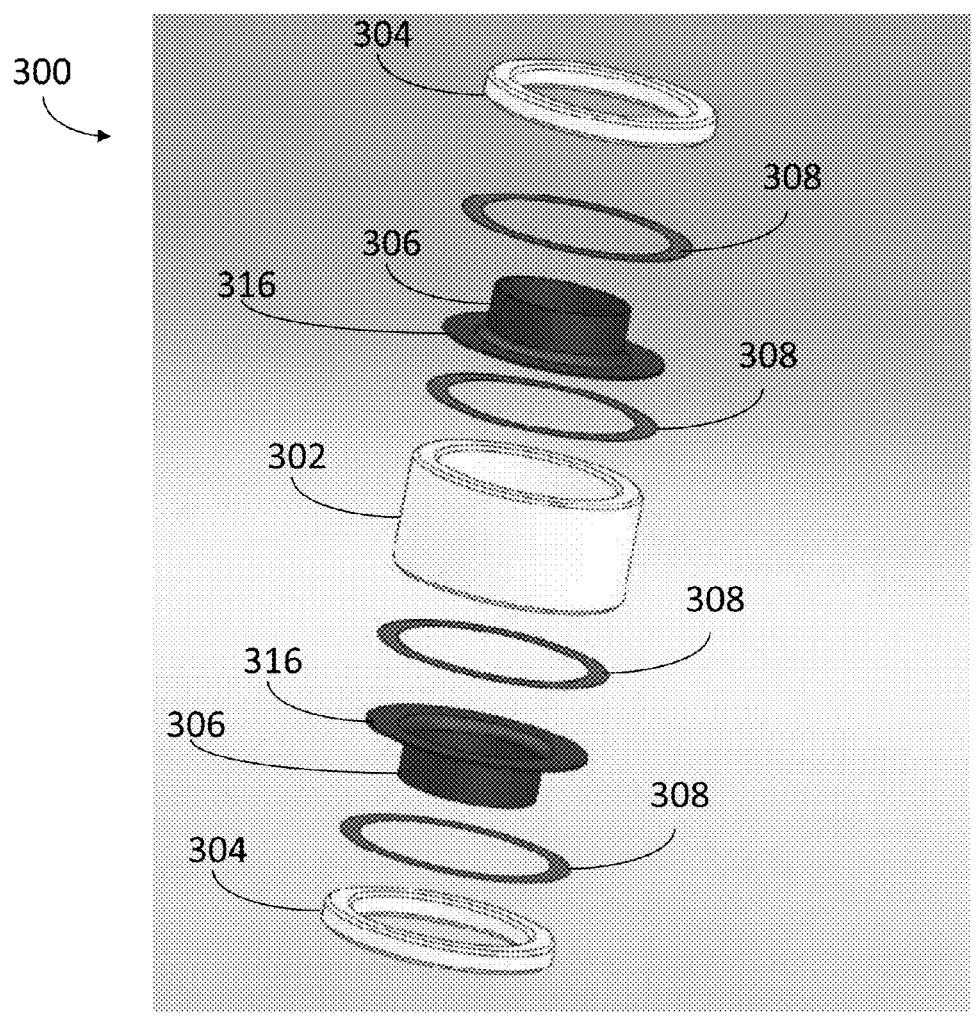
FIG. 3A is an exploded view of an embodiment dielectric conduit assembly.

FIG. 3A illustrates an exploded view of an embodiment dielectric conduit assembly 300 which may comprise a part of conduits 92, 94. The assembly 300 may include a dielectric tube 302. The dielectric tube 302 may be made from a ceramic material with dielectric properties such that it is electrically insulating under operating conditions (e.g., 600-1200° C.). For example, the dielectric tube 302 may comprise alumina or other ceramic materials possessing high dielectric strength at operating temperatures of the fuel cell system. In various embodiments, the dielectric tube 302 may comprise high purity alumina, such as greater than 90% alumina (e.g., 94%-99.8% alumina, such as 97%-99.8% alumina). In alternate embodiments, the dielectric tube 302 may comprise silicon nitride, silicon oxynitride, or silicon aluminum oxynitride (SiAlON) based ceramics or zirconia toughened alumina ("ZTA").

The dielectric tube 302 may be coupled with a metal tube 306 at both ends. Each metal tube 306 may have a "top hat" shape with a flange or lip 316 on the end coupled with the dielectric 302.

In various embodiments, each metal tube 306 may be made of metal alloys that can withstand the operating temperatures of the fuel cell system and have minimal reactivity with gas flowing through the gas delivery device. For example, the metal tubes 306 may comprise stainless steels such as SS 446 (e.g., by weight 23-30% Cr, <1.5% Mn, <0.75% Si, <0.5% Ni, 0.1-0.25% N, <0.12% C, <0.04% P, <0.03% S, balance Fe), 321 stainless (e.g., <0.08% C, 17-19% Cr, 9-12% Ni, <2% Mn, <1% Si, 0.3-0.7% Ti, <0.045% P, <0.03% S, balance Fe), or A286 steels (e.g., 24-27% Ni, 13-16% Cr, 1.9-2.35% Ti, <2% Mn, 1-1.5% Mo, <1% Co, 0.1-0.5% V, <0.35% Al, 0.003-0.01% B, <1% Si, <0.08% C, <0.025% P, <0.025% S, balance Fe), or high temperature alloys, such as Ni—Cr, Ni—Cr—W, Ni—Cr—Mo, Fe—Ni, Ni—Co, Fe—Co, or Fe—Ni—Co alloys. For example, exemplary alloys include Inconel® 600 series alloys, such as 600 (14-17% Cr, 6-10% Fe, 1-1.7% Al, <1% Mn, <0.5% Cu, <0.5% Si, <0.1% C, <0.015 S, balance Ni), 601(21-25% Cr, 58-63% Ni, <1% Mn, <1% Cu, <0.5% Si, <0.15% C, <0.015 S, balance Fe), 625(20-23% Cr, <5% Fe, 8-10% Mo, 3.15-4.15 Nb, <0.015 P, <0.4% Al, <0.5% Mn, <0.4% Ti, <0.5% Si, <0.1% C, <0.015 S, balance Ni), or 625 LCF (20-23% Cr, <5% Fe, 8-10% Mo, 3.15-4.15 Nb, <0.015 P, <0.4% Al, <0.5% Mn, <0.4% Ti, <0.15% Si, <0.03% C, <0.015 S, <1% Co, <0.02% N, balance Ni) alloys; or Haynes® 200, 500, or 600 series alloys, such as 230 (e.g., by weight, 22% Cr, 14% W, 0.5% Mn, 2% Mo, <5% Co, 0.1% C, 0.3% Al, <0.015% B, 0.4% Si, 0.02% La, <3% Fe, balance Ni), 556(e.g., by weight, 22% Cr, 2.5% W, 1% Mn, 3% Mo, 18% Co, 0.1% C, 0.2% Al, 0.6% Ta, 0.4% Si, 0.02% La, 0.02% Zr, 0.2% N, 20% Ni, balance Fe), or 617 (e.g., by weight, 22% Cr, 0.3% Ti, 9% Mo, 12.5% Co, 0.07% C, 1.2% Al, 1% Fe, balance Ni) alloys.

The dielectric assembly 300 may further comprise a dielectric ring 304 coupled with the lip 316 of each metal tube 304. The dielectric rings 304 may comprise a ceramic material similar to the material of the dielectric tube 302. In various embodiments, the dielectric rings 304 and dielectric tube 302 may be matched to have the same or similar coefficient of thermal expansion ("CTE"). For example, the dielectric rings 304 and dielectric tube 302 may comprise the same material. Alternately, the dielectric rings 304 and dielectric tube 302 may comprise different materials, but still have a closely matched coefficient of thermal expansion. In various embodiments, there may be a variability of $10^{-2}$ or less (e.g., a window of $10^{-6}$ to $10^{-8}$) in the CTE values of the dielectric rings 304 and dielectric tube 302.

In alternate embodiments, the dielectric rings 304 and dielectric tube 302 may be deliberately mismatched to have different CTE values. In the dielectric assembly 300, the dielectric rings 304 may hold stress as components expand. More or less stress may be directed to the dielectric rings 304 depending on how the dielectric rings 304, dielectric tube 302, or other components are matched or mismatched.

The dielectric rings 304, dielectric tube 302, and metal tubes 306 may be coupled together by brazing with high temperature braze alloys 308. Braze alloys 308 may comprise nickel based alloys such as Bni-2 (e.g., 82.4% Ni, 7% Cr, 3% Fe, 3.1% B, 4.5% Si), Bni-4(e.g., 93.2% Ni, 1.5% Fe, 1.8% B, 3.5% Si), Bni-5(e.g., 70.9% Ni, 19% Cr, 10.1% Si), Bni-8 (e.g., 65.5% Ni, 23% Mn, 4.5% Cu, 7% Si), and Bni-9 (e.g., 81.4% Ni, 15% Cr, 3.6% B) as specified by AWS. For example, braze alloys 308 may be between the lip 316 of each metal tube 306 and the dielectric tube 302. Braze alloys 308 may also be between the lip 316 and the dielectric rings 304. In alternate embodiments, the joints between the dielectric rings 304, dielectric tube 302, and metal tubes 306 may be connected by welding.

Figure 3B:
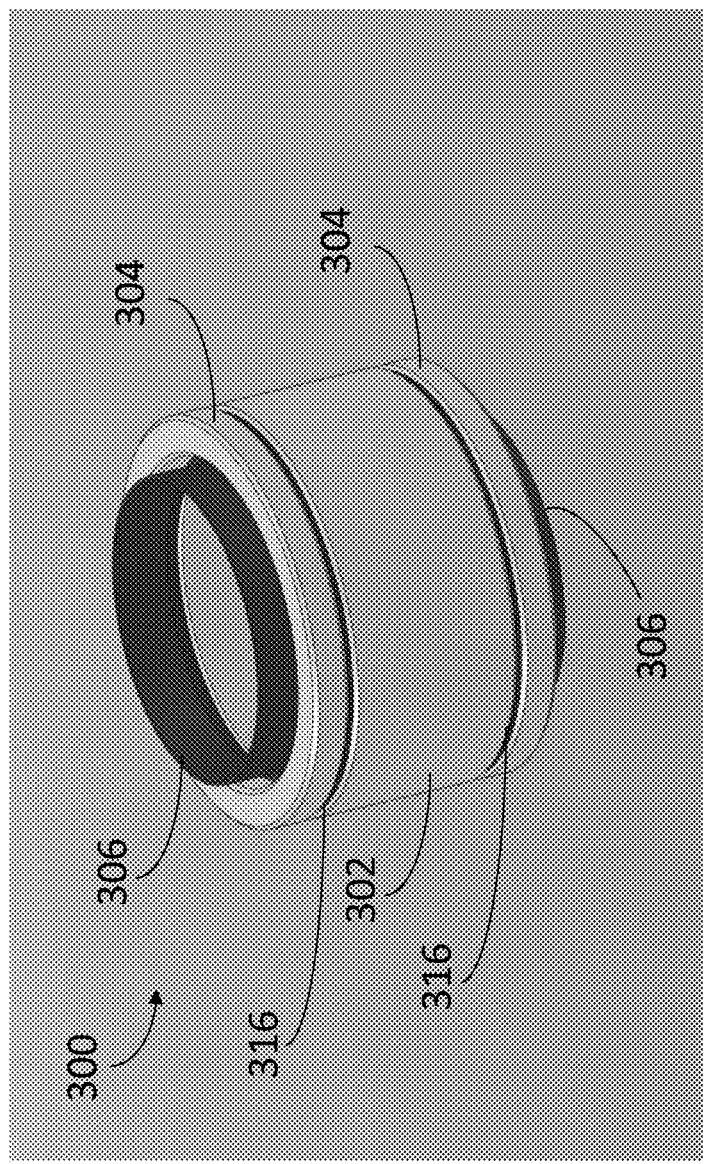
FIG. 3B is an assembled view of the assembly in FIG. 3A.

FIG. 3B illustrates an assembled dielectric assembly 300. The lip 316 of each metal tube 306 may be coupled with opposite ends of the dielectric tube 302, such as with a braze alloy (not shown). Each dielectric ring 304 may go around one of the metal tubes 306. Each dielectric ring 304 may be coupled with the lip 316 of the metal tube 306 such that one side of each lip 316 is coupled with the dielectric tube 302 and the other side of each lip 316 is coupled with a dielectric ring 304. Each dielectric ring 304 may go over metal tube 306 and contact a back side of the lip 316 such that the lip 316 separates the dielectric rings 304 and the dielectric tube 302 and prevents the rings 304 and tube 302 from contacting one another. In alternate embodiments, the dielectric rings 304 may be inside the metal tubes 306 rather than outside the metal tubes 306, such as if the flange or lip 316 extended inward from the circumference of the metal tube 304 as shown for example in FIG. 5A.

In various embodiments, the metal tubes 306 may be coupled with other fuel cell system parts, such as by using metallic joints formed by brazing, welding, or mechanical seals. For example, the metal tubes 306 may be coupled with gas delivery plumbing, a fuel cell stack or column (such as fuel inlets of one or more fuel manifold plates 204 of the stack), and/or a fuel cell hot box. Various embodiment assemblies may be part of the fuel inlet and exhaust conduits 92, 94 connected to the fuel distribution manifolds 204 between the fuel cell stacks 14 (see FIG. 2 for location).

FIG. 4 illustrates an embodiment assembly 400 with the metal tubes 306 coupled to bellows 402 with a joint 404 such as a brazed or welded joint. The bellows 402 may act to compensate for differences in coefficients of thermal expansion between fuel cell components. For example, the bellows 402 may acts to minimize stresses exerted upon the fuel cell stack or column components, such as fuel manifold plates, such as the plates described in U.S. application Ser. No. 11/276,717 filed on Mar. 10, 2006, which is incorporated by reference in its entirety.

In various embodiments, the bellows 402 may minimize stresses exerted upon the fuel cell stack or column by deforming in the axial and/or radial directions in preference to other components of the gas delivery conduits 92, 94 and other fuel cell components. In this way, the bellows 402 may absorb stress rather than transmit stress to other components, such as ceramic components which can crack and break under excessive stress.

In various embodiments, the metal tubes 306 and the bellows 402 may be matched to have the same or similar CTE. For example, the metal tubes 306 and the bellows 402 may comprise the same material or different materials that are closely matched coefficient of thermal expansion.

In alternate embodiments, the metal tubes 306 may include or be made entirely of bellows themselves rather than coupled with bellows 402, such that the bellows 402 may be directly coupled with the dielectric tube 302. As illustrated in FIGS. 5A and 5B, an embodiment assembly 500 may include bellows 402 with a flange or lip 502 which extends inward from the circumference of the bellows 402. One side of the lip 502 may be coupled with the dielectric tube 302, such as by brazing or welding. Dielectric rings 304 may be coupled with the other side of the lip 502, such as with the dielectric rings 304 located inside of the hollow inner space in the bellows 402 as shown in FIG. 5A.

In alternate embodiments, the bellows 402 may have a flange or lip 522 extending outward. FIGS. 5C and 5D illustrate an embodiment assembly 520 with bellows 402 having a lip 522 extending outward. The lip 520 of the bellows 402 may be coupled, such as by brazing or welding, to the dielectric tube 302 and the dielectric rings 304, such as with the dielectric rings 304 located outside of the bellow 402 (i.e., surrounding the bellow's outer circumference) similar to the assembly with metal tubes 306 in FIG. 3B.

Figure 6:
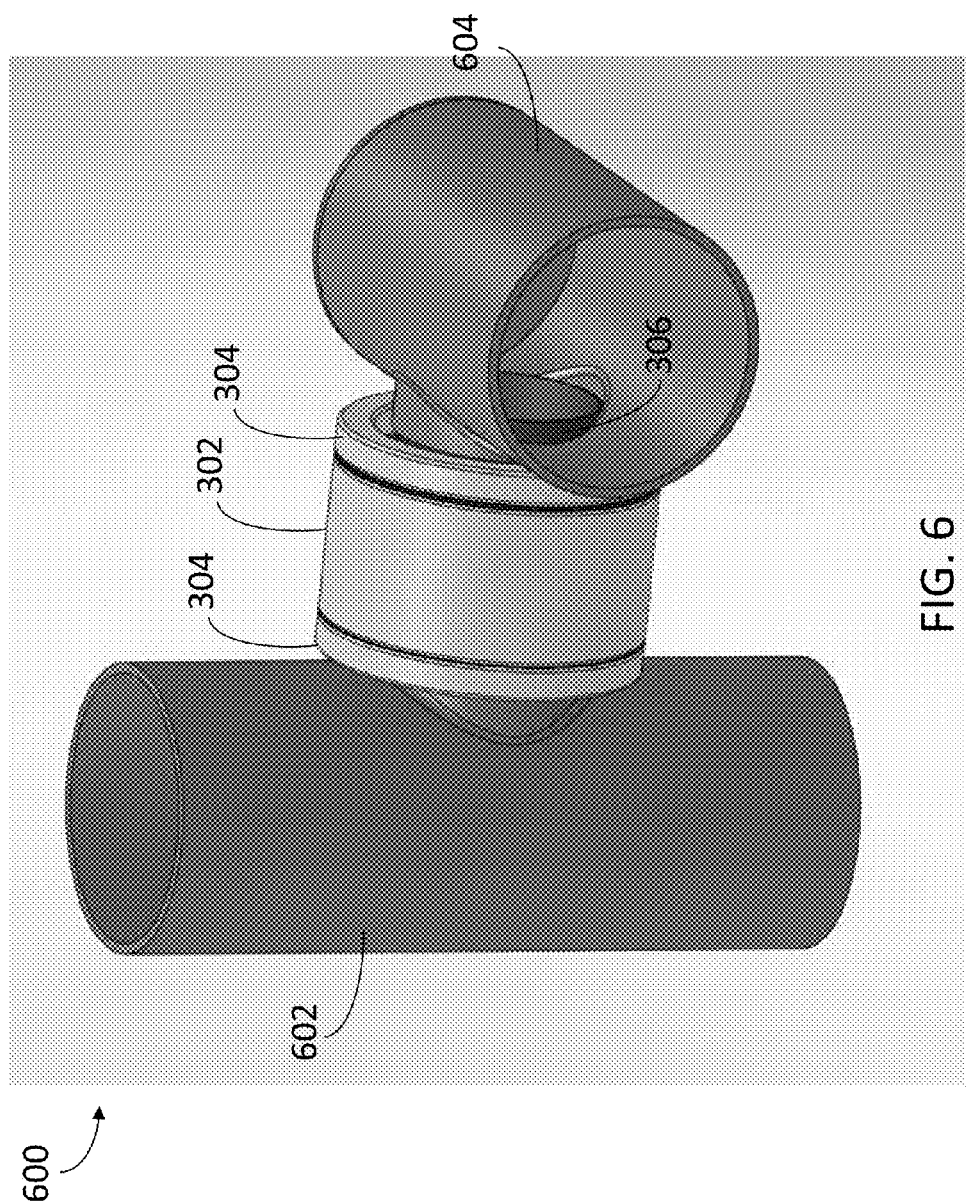
FIG. 6 illustrates an embodiment dielectric conduit assembly in which the metal tubes are coupled with pipe tees.

Although the previous embodiments have illustrated symmetric assemblies with similar structures on both ends of the dielectric tube 302, further embodiment assemblies may connect different structures, such as different components or similar components oriented different ways. For example, as illustrated in FIG. 6, an embodiment assembly 600 may include a first pipe tee 602 connected to one metal tube 306 and a second pipe tee 604 connected to the other metal tube 306. The first pipe tee 602 and second pipe tee 604 may be oriented in different directions. For example, the first pipe tee 602 may deliver fuel in (or fuel out) from the fuel conduits 92, 94 and the second pipe tee 604 may deliver fuel in (or fuel out) to a manifold plate in the fuel cell stack.

In alternate embodiments, pipe tees or other components may be directly coupled with the dielectric tube 302 and dielectric rings 304 similar to how the bellows were coupled with the dielectric tube 302 and dielectric rings 304 in FIGS. 5A and 5C.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A conduit assembly for a fuel cell system, comprising:
   a dielectric tube comprising a first end and a second end;
   a first metal tube comprising a first lip coupled to the first end of the dielectric tube;
   a first dielectric ring coupled to the first lip of the first metal tube;
   a second metal tube comprising a second lip coupled to the second end of the dielectric tube; and
   a second dielectric ring coupled to the second lip of the second metal tube.

2. The conduit assembly of claim 1, wherein the conduit assembly is incorporated into a fuel conduit of a fuel cell stack.

3. The conduit assembly of claim 2, wherein the dielectric tube and the first and second dielectric ring each comprise a ceramic.

4. The conduit assembly of claim of 3, wherein the ceramic comprises zirconia toughened alumina or silicon nitride.

5. The conduit of claim 3, wherein the dielectric tube and first and second dielectric rings have coefficients of thermal expansion that differ by $10^{-2}$ or less.

6. The conduit of claim 3, wherein the dielectric tube and first and second dielectric rings have coefficients of thermal expansion that differ by more than $10^{-2}$.

7. The conduit assembly of claim 2, wherein the first dielectric ring is located inside the first metal tube and the second dielectric ring is located inside the second metal tube.

8. The conduit assembly of claim 7, wherein the first lip extends inward from a circumference of the first metal tube and the second lip extends inward from a circumference of the second metal tube.

9. The conduit assembly of claim 2, wherein the first dielectric ring is located outside the first metal tube and the second dielectric ring is located outside the second metal tube.

10. The conduit assembly of claim 9, wherein the first lip extends outward from a circumference of the first metal tube and the second lip extends outward from a circumference of the second metal tube.

11. The conduit assembly of claim 2, wherein the first and second metal tubes comprise stainless steel or a nickel chromium alloy.

12. The conduit assembly of claim 2, wherein the first and second metal tubes are metal bellows.

13. The conduit assembly of claim 2, wherein the first and second metal tubes are coupled with metal bellows.

14. The conduit assembly of claim 13, wherein the first and second metal tubes are coupled with metal bellows by brazed or welded joints.

15. The conduit assembly of claim 2, wherein the dielectric tube and the first dielectric ring are coupled to the first lip by brazed joints, and wherein the dielectric tube and the second dielectric ring are coupled to the second lip by brazed joints.

16. The conduit assembly of claim 15, wherein the brazed joints comprise a nickel based braze alloy.

17. The conduit assembly of claim 2, wherein the first lip comprises a first surface coupled to the first end of the dielectric tube and a second surface opposite from the first surface and coupled to the first dielectric ring, and
   wherein the second lip comprises a third surface coupled to the second end of the dielectric tube and a fourth surface opposite from the third surface and coupled to the second dielectric ring.

18. A fuel cell system, comprising:
   a fuel cell stack comprising a fuel manifold;
   and a fuel cell conduit assembly fluidly coupled to the fuel manifold, the fuel cell conduit assembly comprising:
   a dielectric tube comprising a first end and a second end;
   a first metal tube comprising a first lip coupled to the first end of the dielectric tube;
   a first dielectric ring coupled to the first lip of the first metal tube;
   a second metal tube comprising a second lip coupled to the second end of the dielectric tube; and
   a second dielectric ring coupled to the second lip of the second metal tube.

19. A fuel cell system assembly method, comprising:
   assembling a conduit assembly, comprising:
   brazing or welding a first end of a dielectric tube to a first surface of a first lip of a first metal tube;
   brazing or welding a first dielectric ring to a second surface of the first lip;
   brazing or welding a second end of the dielectric tube to a third surface of a second lip of a second metal tube; and
   brazing or welding a second dielectric ring to a fourth surface of the second lip; and
   inserting the conduit assembly into the fuel cell system.

20. The method of claim 19, wherein inserting the conduit assembly into the fuel cell system comprises attaching the conduit assembly to a fuel manifold of a fuel cell stack, and wherein the dielectric tube and the first and second dielectric ring each comprise a ceramic.

* * * * *